US006269075B1

(12) United States Patent
Tran

(10) Patent No.: US 6,269,075 B1
(45) Date of Patent: Jul. 31, 2001

(54) FINGER ASSIGNMENT IN A CDMA RAKE RECEIVER

(75) Inventor: Jean-Marie Tran, San Diego, CA (US)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/012,953

(22) Filed: Jan. 26, 1998

(51) Int. Cl.⁷ .............................. H04B 7/216; H04B 1/10
(52) U.S. Cl. .................. 370/206; 370/342; 375/147; 375/349; 455/506
(58) Field of Search ................................ 370/335, 342, 370/209, 465, 538, 320, 322, 206; 375/148, 149, 349, 350, 343, 367

(56) References Cited

U.S. PATENT DOCUMENTS

| 5,590,160 | 12/1996 | Ostman . | |
|---|---|---|---|
| 5,648,983 | 7/1997 | Kostic et al. . | |
| 5,652,748 | 7/1997 | Jolma et al. . | |
| 5,654,979 | * 8/1997 | Levin et al. | 375/206 |
| 5,684,793 | 11/1997 | Kiema et al. . | |
| 5,703,902 | * 12/1997 | Ziv et al. | 375/200 |
| 5,809,020 | * 9/1998 | Bruckert et al. | 370/335 |
| 5,881,056 | * 3/1999 | Huang et al. | 370/335 |
| 5,889,768 | * 3/1999 | Storm et al. | 370/320 |
| 5,926,503 | * 7/1999 | Kelton et al. | 375/206 |

* cited by examiner

Primary Examiner—Alpus H. Hsu
Assistant Examiner—Duc Ho
(74) Attorney, Agent, or Firm—Milan Patel; Brown Martin Haller & McClain

(57) ABSTRACT

A method and apparatus of assigning fingers in a rake receiver for incorporation in a receiver of a CDMA communications system is disclosed herein. The method includes measuring the multipath profile of a received spread-spectrum radio-frequency (RF) signal to obtain a sequence of measurements, identifying the best candidate path of the RF signal to demodulate by determining which measurement within the sequence has the highest signal strength, deriving a timing offset for the best candidate path as a function of the measurement for the best candidate path and its adjacent measurements, and assigning a finger processing element to the best candidate path using the derived timing offset. The measurements are taken using a searcher having a predetermined timing resolution (e.g., ½ chip), and the resolution of the timing offset is higher (e.g., ⅛ chip). The best candidate path to demodulate is identified using the measurement having the highest amplitude or correlation function. The function used to derive the timing offset is a quadratic passing through the measurement for the best candidate path and adjacent measurements. A correction factor can be applied to the estimated timing offset to correct for non-quadratic multipath profiles. The assignment can be made for an available finger, or a finger can be re-assigned where the best candidate path is better than a path currently being demodulated. This approach can also be used to update and instantaneously adjust the timing of fingers to track on-time samples of the received multipaths during operation of the rake receiver.

28 Claims, 4 Drawing Sheets

FINGER ASSIGNMENT IN A CDMA RAKE RECEIVER

FIELD OF THE INVENTION

The present invention generally relates to the field of spread spectrum communications, and specifically relates to assignment of finger processing elements in a Code Division Multiple Access (CDMA) rake receiver.

BACKGROUND OF THE INVENTION

Code Division Multiple Access (CDMA) is a spread-spectrum communication technology that has become increasingly popular in mobile wireless communications systems (e.g., digital cellular radio systems). In a CDMA system, the time and frequency domains are simultaneously shared by all users as a base station simultaneously transmits distinct information signals to multiple subscriber mobile stations over a single frequency band. CDMA systems have a number of advantages over other multiple access systems (e.g., Frequency Division Multiple Access and Time Division Multiple Access) such as increased spectral efficiency and, as discussed below, the ability to mitigate the effects of signal fading using path diversity techniques.

Prior to transmission, the base station multiplies the individual information signal intended for each of the mobile stations by a unique signature sequence, referred to as a pseudo-noise (PN) sequence. This PN sequence can be formed by multiplying a long pseudo-noise sequence with a time offset which is used to differentiate the various base stations in the network, together with a short code unique to each mobile station, for example, the Walsh codes. The multiplication of the information signal by the signature sequence spreads the spectrum of the signal by increasing the rate of transmission from the bit rate to the chip rate. The spread spectrum signals for all subscriber mobile stations are then transmitted simultaneously by the base station. Upon receipt, each mobile station de-spreads the received spread spectrum signal by multiplying the received signal by the mobile station's assigned unique signature sequence. The result is then integrated to isolate the information signal intended for the particular mobile station from the other signals intended for other mobile stations. The signals intended for the other mobile stations appear as noise. The structure and operation of CDMA systems are well known. See, e.g., Andrew J. Viterbi, *CDMA: Principles of Spread Spectrum Communication*, Addison-Wesley Publishing, 1995; Marvin K. Simon, Jim K. Omura, Robert A. Scholtz, and Barry K. Levitt, *Spread Spectrum Communications Handbook*, McGraw-Hill, Inc., 1994.

One advantage of CDMA systems over other multiple-access telecommunications systems is the ability of CDMA systems to exploit path diversity of the incoming radio-frequency (RF) signal. The CDMA signal is communicated from a transmitter to a receiver via a channel including several independent paths, referred to as "multipaths". Each multipath represents a distinct route that the information signal takes between the transmitter and receiver. The transmitted signal thus appears at the receiver as a plurality of multipath signals or "multipaths". Each multipath may arrive at the receiver with an arbitrary timing delay, and each multipath may have a different signal strength at any time due to signal fading.

CDMA systems employ "rake" receivers in mobile units and base stations to exploit this path diversity. Rake receivers estimate the timing delay introduced by each of one or more multipaths in comparison with some reference (e.g., line-of-sight delay), and then use the estimated timing delays to receive the multipaths which have the highest signal strength. A typical rake receiver includes a plurality (e.g., three to six) of rake branches or "fingers". Each finger is an independent receiver unit which assembles and demodulates one received multipath which is assigned to the finger. A rake receiver also includes a separate "searcher" which searches out different signal components of an information signal that was transmitted using the assigned signature sequence of the receiver, and detects the phases of the different signal components. The timing of each finger is controlled such that it is correlated with a particular multipath which arrived at the receiver with a slightly different delay and was found by the searcher. Thus, each finger is "assigned" to a particular multipath by controlling its timing to coincide with arrival of the multipath. The demodulated output from each finger, representing one multipath, is then combined into a high-quality output signal which combines the energy received from each multipath that was demodulated. The implementation of rake receivers is generally known for both forward and reverse CDMA channels. See, e.g., R. Price and P. E. Green, Jr., *A Communication Technique for Multipath Channels*, 46 Proc. Inst. Rad. Eng. 555–70 (March 1958); G. Cooper and C. McGillem, *Modern Communications and Spread Spectrum*, Chapter 12, McGraw-Hill, NY, 1986.

In general, rake receivers estimate the channel using a searcher having a ½ chip resolution (i.e., −0.25/+0.25 chip resolution), and the fingers are assigned using the same resolution. The resolution of the finger assignment creates a timing misalignment between the received signal and the pseudo-noise (PN) sequence generated locally in the finger which results in signal-to-noise ratio (SNR) degradation, or degraded Frame Error Rate (FER) performance. For example, with ½ chip resolution for the searcher and the finger assignment, the resulting timing misalignment of 0.25 chip causes a SNR degradation on the order of 1 dB. Although receivers typically include a delay-locked loop to correct such assignment errors, the loss due to the initial timing mis-alignment becomes significant in the dynamic environments faced by CDMA mobile stations where finger re-assignments may be performed as often as every 5 to 10 frames. The delay-locked loop, which typically requires on the order of 2 frames to correct such initial timing mis-alignments, is too slow to cause the timing mis-alignment of the initial finger assignment to have a non-negligible effect on receiver performance.

One approach to decreasing the performance problems associated with timing mis-alignments caused by the initial finger assignment is to use searchers with improved resolution to estimate the channel. For example, a searcher having ¼ or ⅛ chip resolution could be used. However, the hardware implementation of such a high-resolution searcher would be more complex than the implementation of a ½ chip resolution searcher, and would not be economical or practical for the construction of CDMA mobile stations. Another approach would be to use a delay-locked loop having a fast time constant directly after the initial finger assignment, followed after a period of time by a slower time constant. However, the hardware implementation of such a delay-locked loop would also be more complex, and the initial finger assignment would still result in a significant timing mis-alignment. Thus, it would be desirable to improve the initial assignment of fingers as well as the updating of finger assignments in a rake receiver without increasing the complexity of the hardware implementation for the searcher or the delay-locked loop.

BRIEF SUMMARY OF THE INVENTION

It is an advantage of the present invention to provide a method of determining finger assignments in a CDMA rake receiver with decreased timing mis-alignment compared to the timing mis-alignment of previous rake receivers. This method provides improved SNR and FER following the initial finger assignment and provides means for tracking multipath signals for updating of finger assignments during operation.

It is also an advantage of the invention to provide a method of determining finger assignments with a resolution that is higher than the resolution of the searcher.

It is a further advantage of the invention to provide a rake receiver with improved initial finger assignments yielding decreased timing misalignments.

Still another advantage of the present invention is to provide a rake receiver with improved ability to update finger assignments while tracking any multipath signal.

Yet another advantage of the present invention is to provide a rake receiver and method of use therefor which provide improved ability to determine finger assignments which may be used in base stations or mobile stations within a CDMA communications system.

One embodiment of the present invention relates to a method of assigning finger processing elements in a rake receiver for use in a CDMA communications system. The method includes receiving a spread-spectrum radio-frequency (RF) signal having a plurality of multipath signal components forming a multipath profile, and measuring the profile to obtain a sequence of measurements. Adjacent measurements within the sequence are separated by a predetermined timing resolution, and each measurement has an amplitude indicating signal strength. The method also includes identifying the best candidate path of the RF signal to demodulate by determining which measurement within the sequence of measurements has the highest signal strength, deriving a timing offset for the best candidate path as a function of at least the measurement for that path and the measurements adjacent thereto, and assigning a finger processing element to the best candidate path using the derived timing offset. The derived timing offset has a resolution higher than the predetermined timing resolution.

Another embodiment of the present invention relates to a method of assigning finger processing elements in a rake receiver for use in a CDMA communications system. The method includes receiving a spread-spectrum radio-frequency (RF) signal having a plurality of multipath signal components forming a multipath profile, and measuring the profile to obtain a sequence of measurements. Adjacent measurements within the sequence are separated by a predetermined timing resolution, and each measurement has an amplitude indicating signal strength. The method also includes identifying the best candidate path of the RF signal to demodulate by determining which measurement within the sequence of measurements has the highest signal strength, and determining whether a finger processing element is available. If available, a timing offset is derived for the best candidate path as a function of at least the measurement for that path and the measurements adjacent thereto. The derived timing offset is then used to assign the available finger processing element to the best candidate path. The resolution of the derived timing offset is higher than the predetermined timing resolution.

Yet another embodiment of the present invention relates to a rake receiver for use in a CDMA communications system. The rake receiver includes an antenna for receiving a spread-spectrum radio-frequency (RF) signal having multipath components forming a multipath profile, and finger processing elements coupled to the antenna. Each finger processing element is assignable to a particular propagation path of the RF signal, and can demodulate the assigned path to generate a demodulated signal. A searcher unit coupled to the antenna measures the multipath profile of the RF signal to obtain sequences of measurements. The searcher unit has a predetermined timing resolution which separates adjacent measurements within the sequence, and each measurement has an amplitude indicating signal strength. A finger assignment and control unit coupled to the searcher unit and the finger processing elements reads the sequences of measurements, identifies the best candidate paths of the RF signal to demodulate by determining which measurements within the sequences have the highest signal strengths, derives timing offsets for the best candidate paths as a function of at least the measurements for those paths and the measurements adjacent thereto, and assigns the finger processing elements to the best candidate paths using at least the derived timing offsets. The derived timing offsets have resolutions higher than the predetermined timing resolution of the searcher unit. A combiner combines the demodulated signals from each of the finger processing elements to generate an output signal from the rake receiver.

Another embodiment of the present invention relates to a method of adjusting finger processing elements in a rake receiver for use in a CDMA communications system. The method includes receiving a spread-spectrum radio-frequency (RF) signal having a plurality of multipath signal components forming a multipath profile. One of the multipath signal components of the spread-spectrum RF signal is sampled to obtain early, on-time and late samples using a finger processing element, and a timing offset is derived for the on-time sample as a function of at least the early, on-time and late samples of the sampled multipath signal component. The finger processing element is adjusted to track the timing of the on-time sample of the sampled multipath signal component using the derived timing offset.

BRIEF DESCRIPTION OF THE DRAWINGS

Understanding of the present invention will be facilitated by consideration of the following detailed description of a preferred embodiment of the present invention, taken in conjunction with the accompanying drawings, in which like reference numerals refer to like parts and in which.

DETAILED DESCRIPTION OF A PREFERRED EMBODIMENT

Figure 1:
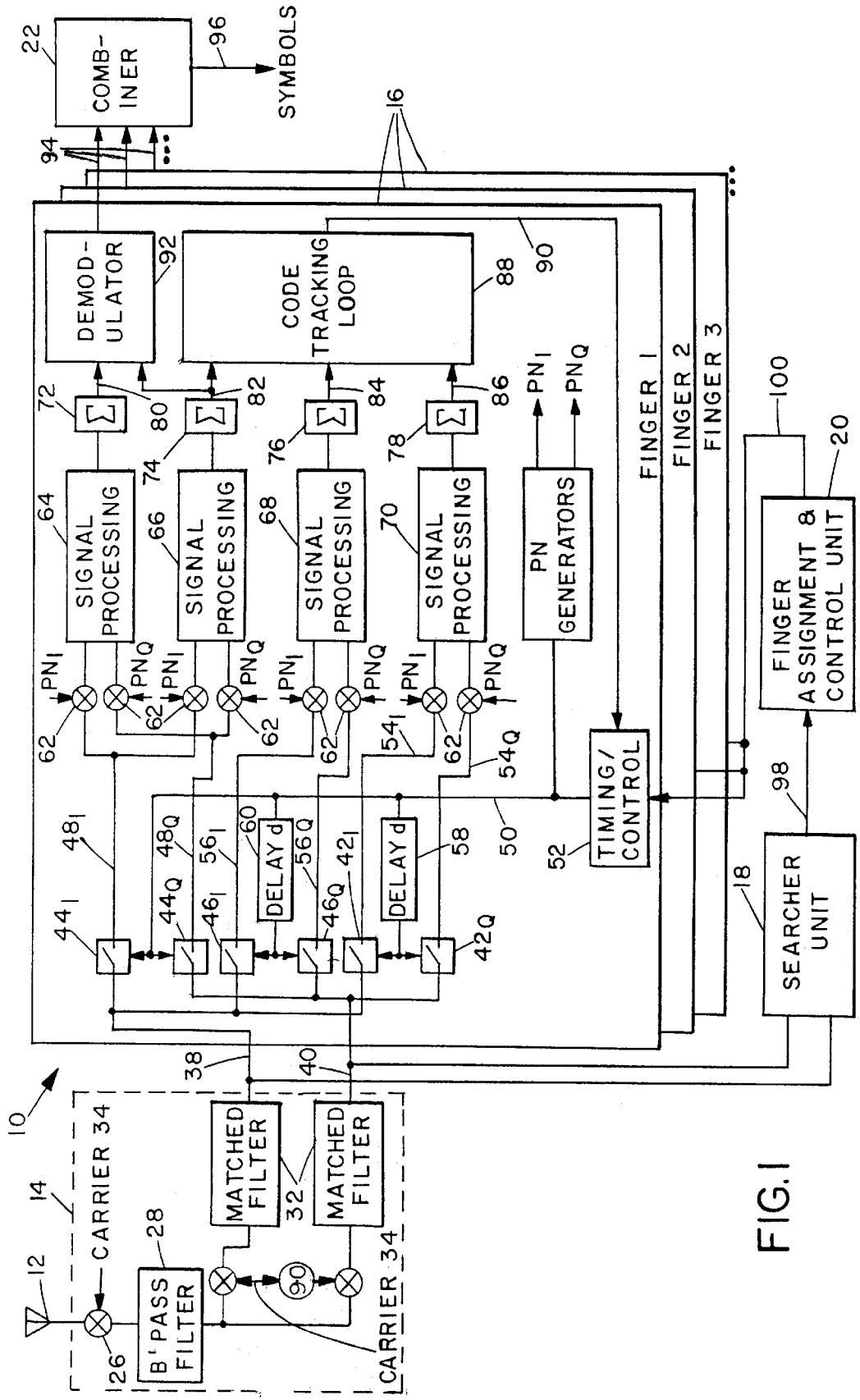
FIG. 1 is a block diagram of a Code Division Multiple Access (CDMA) rake receiver which includes a searcher unit, a finger assignment and control unit, and a plurality of finger processing elements shown in an overlayed relationship.

Referring to FIG. 1, a Code Division Multiple Access (CDMA) rake receiver 10 for use in a CDMA communications system is shown. The rake receiver includes an antenna element 12, an input circuit 14, a plurality of finger processing elements or "fingers" 16, a searcher unit or "searcher" 18, a finger assignment and control unit 20, and a combiner element 22. It should be noted that, while the exemplary embodiment relates to a rake receiver in the receiver of a mobile unit, the principles described herein may also be applied to rake receivers in a base station receiver.

Antenna element 12 receives a spread-spectrum radio-frequency (RF) signal 24 transmitted by one or more CDMA base stations (not shown). Input circuit 14 receives RF signal 24 from antenna element 12, and processes it using a first de-modulator 26, a bandpass filter 28, a second de-modulator 30, and a matched filter 32. De-modulator 26 multiplies RF signal 24 by a carrier frequency signal 34, and bandpass filter 28 filters the product at the nominal CDMA communication system bandwidth to generate an Intermediate Frequency (IF) signal 36. Demodulator 30 downconverts IF signal 36 at the baseband by splitting the signal and multiplying the branches by the in-phase and quadrature-phase, respectively, of carrier frequency signal 34. Matched filter 32 processes the resulting in-phase and quadrature-phase signals at the transmitted pulse shape of the CDMA communications system to generate in-phase and quadrature-phase signal components 38 and 40, respectively.

Each finger 16 receives both in-phase and quadrature-phase signal components 38 and 40, respectively, and is assigned to de-modulate a separate multipath of RF signal 24. Although three fingers are shown in FIG. 1, rake receiver 10 could include other numbers of fingers (e.g., four, five, six, etc.) which would be assigned to and would de-modulate other propagation paths. Fingers 16 are shown in overlaid relationship in FIG. 1, with a first finger (i.e., FINGER1) on top of other fingers (i.e., FINGER2, FINGER3, etc.). Each finger has the structure shown in detail for FINGER1.

Each finger 16 includes samplers 42, 44 and 46 for sampling early, on-time and late in-phase and quadrature-phase components, respectively.

The subscripts I (e.g., $42_I$, $44_I$, $46_I$) and Q (e.g., $42_Q$, $44_Q$, $46_Q$) indicate that the samplers sample the in-phase and quadrature-phase components, respectively. The timing of on-time samples $48_I$ and $48_Q$ depends on a sample timing signal 50 generated by a timing/control unit 52. The timing of early samples $54_I$ and $54_Q$ and late samples $56_I$ and $56_Q$ are advanced and delayed relative to the timing of on-time samples $48_I$ and $48_Q$ by a delay time d due to a pair of delay elements 58 and 60, respectively.

Each finger 16 is a coherent receiver which uses a reference pilot channel for coherent detection. Thus, on-time samples $48_I$ and $48_Q$ include both traffic-channel and pilot-channel samples. The pilot-channel can be either reference symbols embedded in the traffic symbols, or a continuous pilot signal transmitted on a separate physical channel. The early, on-time, and late in-phase and quadrature-phase signals are then de-spread using multipliers 62 and in-phase and quadrature-phase PN sequences $PN_I$ and $PN_Q$ respectively. $PN_I$ and $PN_Q$ are generated by PN generators 63 using sample timing signal 50 as an input signal. The quadrature-spreading may, for example, follow the IS-95 standard entitled "Mobile Station-Base Station Compatibility Standard for Dual-Mode Wideband Spread Spectrum Cellular System". The de-spread signals are operated on by signal processing elements 64–70 which, for example, perform multiple access separation.

The output signals from elements 64–70 are accumulated by integrators 72–78 to form accumulated signals 80–86, respectively.

Each finger 16 includes a code tracking loop 88 which receives the early and late samples of the traffic or pilot channel 82–86, and generates a tracking adjustment signal 90 based on the difference between the early and late samples. The channel is correctly estimated when the difference between the early and late samples is substantially zero. Tracking adjustment signal 90 is applied to timing/control unit 52 such that sample timing signal 50 tracks the timing of the multipath being demodulated by the finger 16. The tracking accounts for changes in the timing of the multipath due, for example, to relative motion between the transmitter and receiver 10. Each finger 16 also includes a de-modulator unit 92 which de-modulates the traffic-channel on-time samples 80 using the pilot-channel on-time samples 82 to estimate the traffic channel. The de-modulated output symbols 94 generated by each finger 16 are then time-aligned and combined in combiner 22 to form high-quality output signal 96. Thus, high-quality output signal 96 effectively includes the transmitted energy which propagated through each of the multipaths to which each of fingers 16 were assigned. High-quality output signal 96 may be processed and then used, for example, to drive a speaker (not shown).

In-phase and quadrature-phase signal components 38 and 40, respectively, are also processed by searcher unit 18 to measure the multipath environment. The sequence of measurements 98 from searcher unit 18 is reduced in finger assignment and control unit 20, and is then used by unit 20 to make decisions to assign fingers 16, de-assign fingers 16, or continue to use the fingers 16 already assigned to a multipath, as explained below. The signals 100 from unit 20 are applied to timing/control unit 52 of each of the fingers 16 to make the initial finger assignments for rake receiver 10.

The filtering performed by bandpass filter 28 and matched filter 32 rejects out-of-band interference and noise, and matched filter 32 matches the pulse shape of the transmitted signal for optimal performance under the additive white Gaussian Noise channel assumption. However, the well-known effect of bandpass filter 28 is to degrade the correlation properties of the PN sequence. See, e.g., R. Dixon, *Spread Spectrum Systems with Commercial Applications*, $3^{rd}$ ed., Wiley Interscience, p. 264 (1994). The degradation can be calculated using the derivations found in A. Viterbi, *CDMA Principles of Spread Spectrum Communication*, Addison-Wesley, Ch. 3 (1995). For example, assuming a received signal at baseband given by:

$$\Sigma_k(m(k)a'_n(k)\delta(t-kT_c)\cos(2\pi ft+\phi)+m(k)a^Q_n(k)\sin(2\pi ft+\phi))*h(t-kT_c) \quad (1)$$

wherein m(k) is the kth symbol, $a^I_n$ is the in-phase PN sequence, $a^Q_n$ is the quadrature-phase PN sequence, $T_c$ is the chip period, f is the carrier frequency, $\phi$ is an unknown phase, and h(t) is the transmitter bandpass filter impulse response. The term m(k) is constant over a number of chips $N_c$, and is known for the pilot channel and unknown for the traffic channel.

Figure 2:
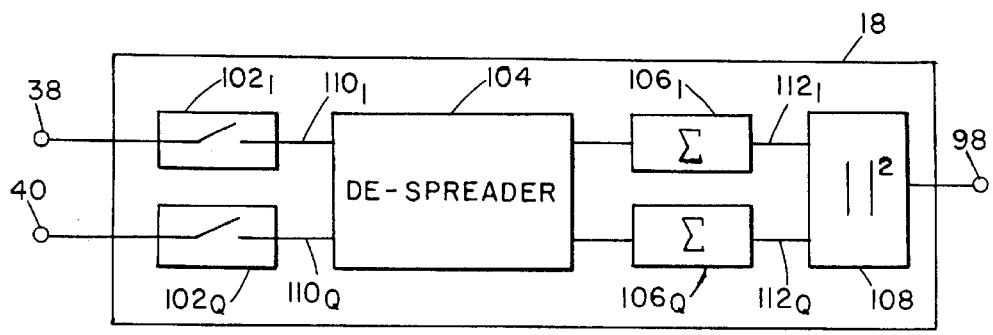
FIG. 2 is a block diagram of the searcher unit shown in FIG. 1.

Referring to FIG. 2, searcher unit 18 includes a search engine element as shown. Searcher unit 18 includes in-phase and quadrature-phase samplers $102_I$ and $102_Q$, a de-spreader element 104, accumulators $106_I$ and $106_Q$, and a magnitude squaring unit 108. Assuming perfect match filtering, the in-phase signal input $110_I$ to de-spreader element 104 is given by:

$$\Sigma_K(a^I_n(k)\cos\phi + a^Q_n(k)\sin\phi)\ h(t-kT_c) \cdot h'(t) \quad (2)$$

and the quadrature-phase signal input $1100_Q$ to element 104 is given by:

$$\Sigma_K(a^Q_n(k)\cos\phi - a^I_n(k)\sin\phi)h(t-kT_c)*h'(t) \quad (3)$$

wherein h'(t) is the impulse response of match filter 32. De-spreader 104 is a complex de-spreader which multiplies each chip sample by $a^I_n(k) - ja^Q_n(k)$. Letting $H(t-kT_c) = h(t-kT_c)*h'(t)$, then the signal 112 (neglecting interference terms) at the output of accumulator 106 is $N_cH(delay)e^{-j\phi}$, wherein delay is a small delay in the generated PN timing in complex de-spreader 104. Magnitude squaring unit 108 eliminates the arbitrary initial phase such that measurements 98 are proportional to $H(delay)^2$. Assuming perfect matched filtering in an IS-95 compatible system, the loss is on the order of 11 dB for a ¾ chip delay, 4 dB for a ½ chip delay, 2 dB for a ⅜ chip delay, 1 dB for a ¼ chip delay, and 0.2 dB for a ⅛ chip delay. Thus, searcher unit 18 typically measures the multipath environment with ½ chip resolution to avoid unacceptable signal loss due to sampling errors. Although it is possible to use a searcher unit with higher resolution than the typical ½ chip, such high-resolution searchers require increased hardware complexity which may not be appropriate or desirable for use in CDMA mobile stations or base stations.

Referring briefly back to FIG. 1, finger processing elements 16 have a higher (i.e., finer) timing resolution than the typical ½ chip timing resolution of searcher unit 18. This higher timing resolution is required by code tracking loop 88. See, e.g., R. Dixon, *Spread Spectrum Systems with Commercial Applications*, $3^{rd}$ Ed., Wiley lnterscience, pp. 254–261 (1994). Code tracking loop 88 is generally implemented by a delay-locked loop which processes a difference signal between amplitudes of the early and late signal components 86 and 84 with an integration filter followed by a threshold detector which triggers a timing adjustment from timing/control unit 52 via signal 90. The timing adjustment resolution of timing/control unit 52 is generally in the range of 1/16 to ¼ chip, and is typically ⅛ chip. Thus, the timing resolution of fingers 16 are typically greater (i.e., finer) than the timing resolution of searcher unit 18. As described below, finger assignment and control unit 20 processes measurements 98 to provide initial finger assignment signal 100 which, when applied to timing/control unit 52, allows timing of fingers 16 to be initialized using the higher (i.e., finer) resolution of finger 16 rather than the lower (i.e., coarser) resolution of searcher unit 18.

Figure 3:
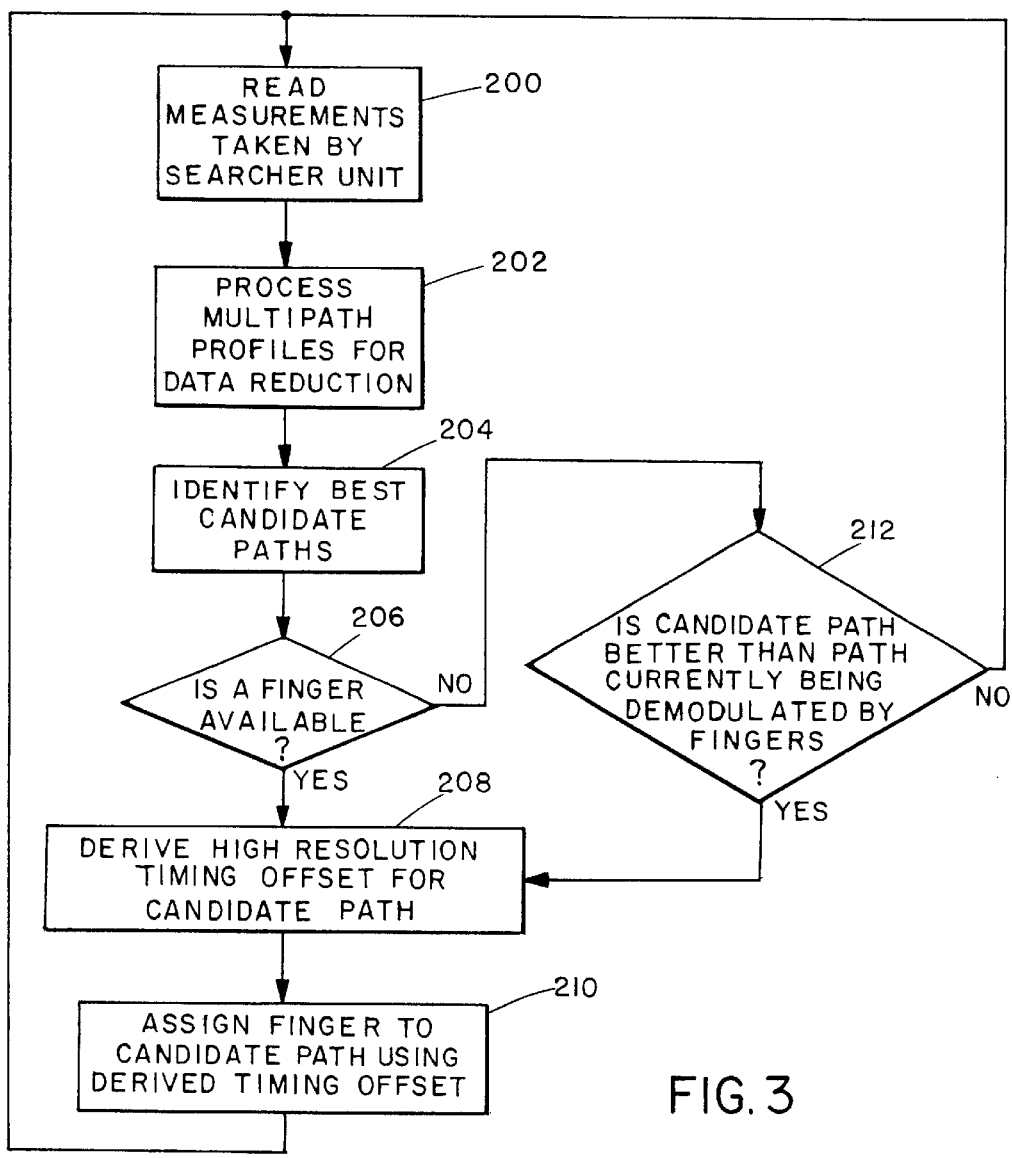
FIG. 3 is an exemplary flow chart showing the steps performed by the finger assignment and control unit shown in FIG. 1 to read the searcher unit, identify the best candidate paths to be demodulated by the finger processing elements, derive high-resolution timing offsets for the best candidate paths, and assign the finger processing elements to the best candidate paths.

Referring to the flow chart of FIG. 3, the processing steps performed by finger assignment and control unit 20 to generate initial finger assignment signal 100 are shown. At step 200, unit 20 reads sequences of measurements 98 taken by searcher unit 18. These sequences represent multipath profiles or signal amplitudes of the RF signal as a function of timing offset. At steps 202 and 204, unit 20 processes the multipath profiles for data reduction and identifies the best candidate multipaths of the RF signal to demodulate. The best candidate multipath is that path with the largest amplitude, since the amplitude reflects signal strength. In previous CDMA rake receivers, the peak location of the best candidate path determined by the searcher unit was used to make the initial finger assignment. However, if searcher unit 18 has a search timing resolution T (e.g., ½ chip), there would have been ±T/2 (e.g., ±¼ chip) uncertainty in the initial finger assignment even though fingers 16 typically have a higher (i.e., finer) timing resolution (e.g., ⅛ chip) than the timing resolution of the searcher unit. The resulting timing misalignment due to this initial finger assignment would have caused performance losses of as much as 1 dB until the code tracking loop would have had sufficient time to correct the error.

This loss can be significant in the dynamic environments in which CDMA mobile stations and base stations operate. To improve the initial finger assignment, unit 20 estimates the peak path location as a function of the sequence of measurements taken by searcher unit 18 as explained below.

This technique is useful both for receivers having code tracking loops, and those without.

At step 206, unit 20 determines whether a finger 16 of receiver 10 is currently available (i.e., is there is a finger 16 that is not currently de-modulating an assigned multipath?). If so, unit 20 derives a timing offset for the best candidate path at step 208, as described below, and assigns the available finger 16 to the best candidate path using the derived timing offset at step 210. If no finger 16 is available, unit 20 determines at step 212 whether the best candidate path is better than a multipath currently being de-modulated by one of fingers 16. If so, unit 20 again derives a timing offset for the best candidate path at step 208, and re-assigns that finger 16 to the best candidate path using the derived timing offset at step 210. If not, unit 20 does not perform the deriving or assigning steps 208 or 210.

At step 208, unit 20 uses the measurements taken at the best candidate path, and the measurements taken with adjacent timing offsets (i.e., ½ chip apart for a ½ chip resolution searcher unit 18), to derive a timing offset for the best candidate path. Let M(−1), M(0) and M(1) be the measurements taken by searcher unit 18, with M(0) being the measurement corresponding to the best candidate path and M(−1) and M(1) being the measurements taken adjacent to M(0) (i.e., M(−1) and M(1) being taken ½ chip before and ½ chip after M(0), respectively, for a ½ chip resolution searcher). Each measurement can be either the correlation function, or the square root thereof (i.e., the signal amplitudes). The multipath profile of RF signal 24 can be approximated using the quadratic:

$$Y = A*t^2 + B*t + C \quad (4)$$

the unknown coefficients A, B and C being the solution to the linear system:

$$A - B + C = M(-1) \quad (5)$$

$$C = M(0) \quad (6)$$

$$A + B + C = M(1) \quad (7)$$

The peak of the quadratic, corresponding to the multipath with peak signal strength, can be found by setting the time derivative of profile Y equal to 0:

$$dY/dt = 2*A*t + B = 0 \quad (8)$$

Combining equations (5)–(8), and solving for t, yields:

$$t=(M(-1)-M(1))/(2*(M(-1)+M(1)-2*M(0))) \qquad (9)$$

The timing offset of the peak is then estimated based upon the quadratic approximation as t/f, where 1/f is defined as the fraction of a chip corresponding to the measurement sampling period (e.g., the timing offset =t/2 for a ½-chip searcher). This estimate timing offset is used by unit 20 to assign or re-assign a finger 16 to the location of the best candidate path.

This parabolic or quadratic approximation may be implemented on a digital signal processing (DSP) integrated circuit, in either floating or fixed point. Alternatively, since the computational load is relatively low, the processing could also be implemented on a microcontroller (MCU) or other hardware circuitry capable of performing the process shown in FIG. 3.

Searcher unit 18 may take a large number of measurements to measure a relatively large window. However, as shown by the equations above, only the M(−1), M(0) and M(1) measurements from searcher unit 18 need be processed by unit 20 since only these measurements contain the amplitude data for the peak location and its adjacent locations. Thus, at step 202, unit 20 may process the sequence of measurements from searcher unit 18 to reduce the amount of data. Reducing the data to eliminate the other measurements minimizes the amount of data transfer that will be required, and minimizes the memory requirements for the DSP or MCU. Further, even if the largest M correlation values and PN locations are sorted and stored rather than only the best local peaks, the required information is very likely to be available because of the broad shape of the correlation function.

Figure 4:
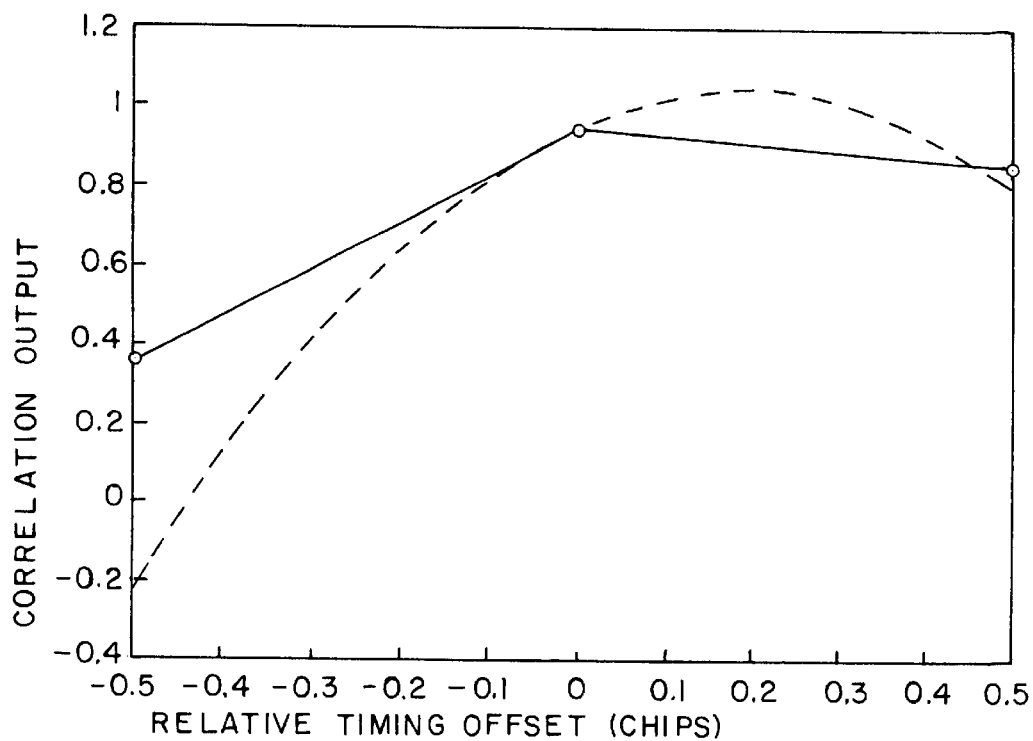
FIG. 4 is an exemplary graph illustrating the quadratic approximation performed by the finger assignment and control unit to derive the high-resolution timing offset (in chips) used to assign a finger processing element.

Referring to FIG. 4, an example of the quadratic approximation performed by finger assignment and control unit 20 at step 208 is shown. The x-axis represents the relative timing offset (in chips), and the y-axis represents the correlation output. Thus, the graph illustrates an exemplary multipath profile of RF signal 24. This example assumes that searcher unit 18 takes measurements using a ½ chip timing resolution. As can be seen, the ½ chip timing resolution caused an error in measuring the best candidate path, which occurred at a relative timing offset of approximately 0.19 chip. The best candidate path, identified at step 204, is located at a relative timing offset of 0 and has a correlation measurement M(0) of 0.9345. The adjacent measurements, located at relative timing offsets of +/−0.5 chip, had correlation measurements M(−1) of 0.3563 and M(1) of 0.8540, respectively. Application of equation (9) yields an estimated timing offset from the quadratic of t/2=0.19 chip. Thus, in this example, unit 20 would add 0.19 chip, or its equivalent quantized value, to the PN offset corresponding to the largest value. For a finger 16 having a timing/control unit 52 with a timing adjustment resolution of ⅛ chip, the 0.19 chip would result in a ⅛ chip timing adjustment (i.e., with a ⅛ chip resolution, a ⅛ chip adjustment is the nearest approximation to the 0.19 chip estimate).

In reality, however, the shape of the multipath profile measured by searcher unit 18 may not be accurately represented by a quadratic. Non-quadratic shapes may occur, for example, due to the pulse shaping of the transmitter and the particular implementation of the matched filter in the receiver. For example, the multipath profile may have the non-quadratic shape shown in FIG. 5. When the profile has such a non-quadratic shape, the estimated timing offset from the quadratic may not be sufficiently accurate. However, assuming that the actual profile measured by the searcher unit can be estimated through empirical measurements or theoretical calculations, one can a priori predict the estimation error introduced by the use of the quadratic approximation on a non-quadratic profile shape. Based on the actual profile information, a correction curve can be determined, and can be used to generate correction factors. These factors, in turn, can be applied to the estimated timing offset from the quadratic to correct the estimated timing offset.

Figure 5:
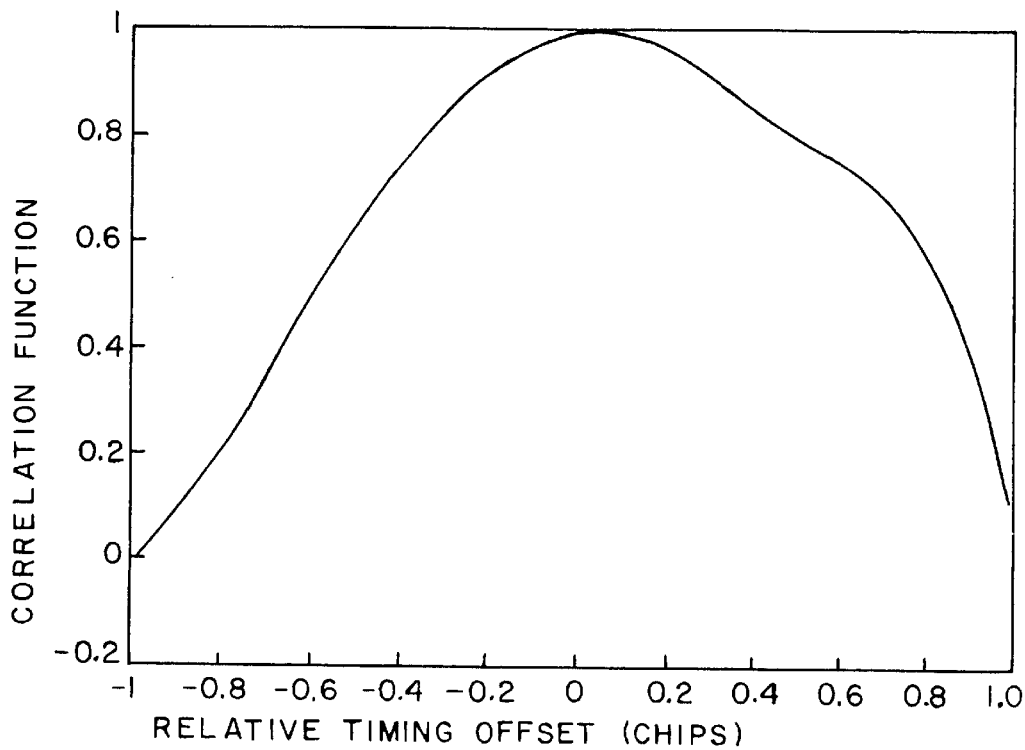
FIG. 5 is an exemplary graph illustrating a possible shape of the correlation function which differs from the quadratic shape shown in FIG. 4.
Figure 6:
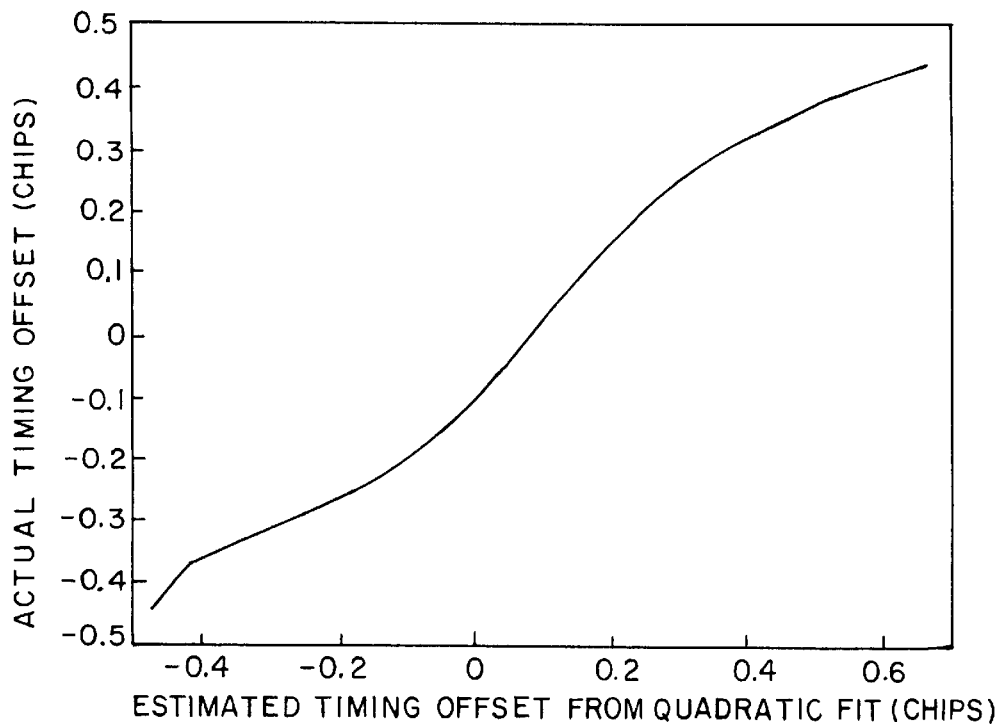
FIG. 6 is a curve showing the relationship between the estimated timing offset determined by quadratic approximation and the actual timing offset for the non-quadratic correlation function illustrated in FIG. 5.

Referring to FIG. 6, a curve showing the relationship between the estimated timing offset, determined by quadratic approximation as described above, and the actual timing offset, determined by empirical measurements or theoretical calculations, is shown for the exemplary non-quadratic correlation function illustrated in FIG. 5. A perfect quadratic correlation function would result in the curve of FIG. 6 being a straight line having a slope such that the estimated timing offset from the quadratic fit equals the actual timing offset. However, because of the non-quadratic shape of the correlation function of FIG. 5, the timing offsets are slightly biased toward positive values. For a peak perfectly centered at a timing offset of 0, the quadratic approximation of the correlation function of FIG. 5 would yield an estimated peak location of approximately 0.1 chip. The correlation function of FIG. 5 can be used to build a calibration or lookup table, stored in unit 20, with actual estimates given by FIG. 6 and indexed by the estimated timing offset derived using the quadratic fit method. Alternatively, a table of corrections could be stored having an unbiased estimator.

Figure 7:
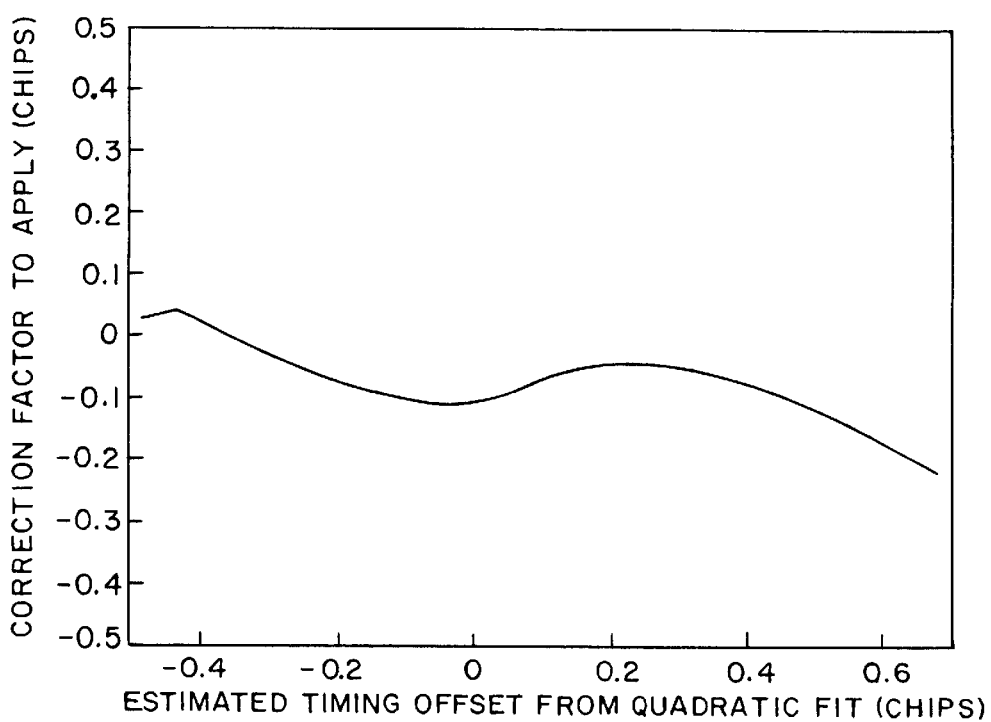
FIG. 7 shows a correction curve for the non-quadratic correlation function illustrated in FIG. 5 which is used to determine a correction factor which can be applied (i.e., added) to the estimated timing offset which was determined by quadratic approximation to generate the actual timing offset.

For the example shown in FIGS. 5 and 6, the corresponding correction curve is shown in FIG. 7. The estimated timing offset from the quadratic is used by unit 20 as an index (to the x-axis of the curve) to determine a correction factor (found on the y-axis of the curve). The correction factor is applied to the estimated timing offset from the quadratic simply by adding it to the estimated timing offset. For example, if the estimated peak location is 0, a correction factor of approximately −0.1 chip is added to the estimated peak location to determine the actual peak location. The corrected timing offset is then used to initialized the finger assignment for the best candidate path. Alternatively, the correction curve shown in FIG. 7 could be parametrized using polynomials. Because the corrections are second order corrections, low-order polynomials (e.g., $3^{rd}$ order polynomials) may be used.

As described above, rake receiver 10 can estimate the path locations of the best multipaths, and can assign the finger units to these multipaths, with resolutions or accuracies exceeding that of the searcher unit. For example, with a ½ chip resolution searcher unit, the fingers can be assigned with ¼ or ⅛ chip resolution and accuracy. ¼ or ⅛ chip resolution will yield a maximum SNR loss of about 0.12 dB or 0.06 dB, respectively. By estimating the path locations as described above, a lower-resolution searcher unit having a less-complex hardware implementation can still be used.

As described above, the method and apparatus of the present invention can be used to make the initial finger assignments in a CDMA rake receiver for incorporation in either a base station or a mobile station. In addition, the above-described approach can be used to make adjustments or corrections to the finger timing during operation of a rake receiver at a speed which is faster than the speed at which the delay-locked loop makes such adjustments. For the updating application, the algorithm described above is implemented by each finger 16 within a tracking block which replaces code tracking loop 88 in FIG. 1. The algorithm processes the on-time, early and late samples to derive a timing offset in a manner similar to that described above (e.g., by passing a quadratic through the on-time, early and late samples), and uses the derived timing offset to adjust tracking adjustment signal 90 so that the finger tracks the on-time signal. A correction factor based on a correction curve or lookup table can be generated and applied to the derived timing offset from the quadratic to account for non-quadratic effects. Thus, the timing of fingers 16 is adjusted instantaneously to track the on-time signal during operation of the receiver, eliminating the need to wait for the relatively slow adjustments that are performed by the delay-locked loop within code tracking loop 88. The adjustment of fingers 16 during operation of the rake receiver using the above algorithm can be performed regardless of whether or not the previously-described algorithm is used to make the initial finger assignments.

It will be evident that there are additional embodiments and applications which are not disclosed in the detailed description but which clearly fall within the scope and spirit of the present invention. For example, although the estimated timing offsets may be derived as a function of a quadratic equation, other functions or formulas may be used to derive the estimated timing offsets from the appropriate measured or sampled signal inputs. The specification is, therefore, not intended to be limiting, and the scope of the invention is to be limited only by the following claims.

I claim:

1. A method of assigning finger processing elements in a rake receiver for use in a CDMA communications system, comprising the steps of:

receiving a spread-spectrum radio-frequency (RF) signal having a plurality of multipath signal components forming a multipath profile;

measuring the multipath profile of the RF signal to obtain a sequence of measurements, wherein adjacent measurements within the sequence are separated by a predetermined timing resolution, and each measurement has an amplitude indicative of signal strength;

identifying the best candidate path of the RF signal to demodulate by determining which measurement within the sequence of measurements has the highest signal strength;

deriving a timing offset for the best candidate path as a function of at least the measurement for the best candidate path and the measurements adjacent thereto, wherein the derived timing offset has a resolution higher than the predetermined timing resolution; and assigning a finger processing element of the rake receiver to the best candidate path using the derived timing offset.

2. The method of claim 1, further comprising the step of demodulating the RF signal to obtain its in-phase and quadrature-phase components, wherein the measuring step includes sampling the in-phase and quadrature-phase components of the RF signal, de-spreading the sampled components, accumulating the de-spread components, and squaring the magnitude of the accumulated RF signal to obtain the measurement of the RF signal.

3. The method of claim 1, wherein the deriving step includes defining a quadratic to approximate the multipath profile of the RF signal by passing substantially through the measurement for the best candidate path and the measurements adjacent thereto, and solving for the peak of the quadratic to estimate the timing offset for the best candidate path.

4. The method of claim 3, wherein the quadratic has the form $Y=A*t^2+B*t+C$, the coefficients being the solution to a linear system defined by:

$$A-B+C=M(-1)$$

$$C=M(0)$$

$$A+B+C=M(1);$$

$M(0)$ being the measurement for the best candidate path, and $M(-1)$ and $M(1)$ being the measurements adjacent to $M(0)$.

5. The method of claim 4, wherein the peak of the quadratic occurs at:

$$t=(M(-1)-M(1))/(2*(M(-1)+M(1)-2*M(0)));$$

and the estimated timing offset from the quadratic is $t/f$, where $1/f$ is the fraction of a chip corresponding to the predetermined timing resolution.

6. The method of claim 3, wherein the deriving step further includes generating a correction factor and applying the correction factor to the estimated timing offset from the quadratic, wherein the correction factor is generated using the estimated timing offset from the quadratic as an index to a correction curve representing differences between a set of estimated timing offsets determined using the quadratic and actual timing offsets.

7. The method of claim 3, wherein the deriving step includes generating a correction factor and applying the correction factor to the estimated timing offset from the quadratic, wherein the correction factor is determined using the estimated timing offset from the quadratic as an index to a lookup table having an unbiased estimator.

8. The method of claim 1, wherein the predetermined timing resolution of the measurements is ½ chip.

9. The method of claim 8, wherein the resolution of the derived timing offset is within a range between 1/16 chip and ¼ chip.

10. The method of claim 8, wherein the resolution of the derived timing offset is ⅛ chip.

11. A method of assigning finger processing elements in a rake receiver for use in a CDMA communications system, comprising the steps of:

receiving a spread-spectrum radio-frequency (RF) signal having a plurality of multipath signal components forming a multipath profile;

measuring the multipath profile of the RF signal to obtain a sequence of measurements, wherein adjacent measurements within the sequence are separated by a predetermined timing resolution, and each measurement has an amplitude indicative of signal strength;

identifying the best candidate path of the RF signal to demodulate by determining which measurement within the sequence of measurements has the highest signal strength; and determining whether a finger processing element is available and, if so, deriving a timing offset for the best candidate path as a function of at least the measurement for the best candidate path and the measurements adjacent thereto, the resolution of the derived timing offset being higher than the predetermined timing resolution, and assigning the available finger processing element to the best candidate path using the derived timing offset.

12. The method of claim 11 wherein, if no finger processing element is available, the determining step also determines whether the candidate best path is better than a path currently being demodulated and, if so, performs the deriving and assigning steps for the finger processing element which is currently demodulating the path that is worse than the candidate best path.

13. The method of claim 12 wherein, if no finger processing element is available and the candidate best path is not better than a path currently being demodulated, the deriving and assigning steps are omitted.

14. A rake receiver for use in a CDMA communications system, comprising:
- an antenna for receiving a spread-spectrum radio-frequency (RF) signal having a plurality of multipath components forming a multipath profile;
- a plurality of finger processing elements coupled to the antenna, each finger processing element being configured to be assigned to a particular propagation path of the RF signal, and to demodulate the assigned propagation path of the RF signal to generate a demodulated signal;
- a searcher unit coupled to the antenna and configured to measure the multipath profile of the RF signal to obtain sequences of measurements, the searcher unit having a predetermined timing resolution which separates adjacent measurements within the sequences of measurements, and each measurement having an amplitude indicative of signal strength;
- a finger assignment and control unit coupled to the searcher unit and the plurality of finger processing elements and configured to read the sequences of measurements, to identify the best candidate paths of the RF signal to demodulate by determining which measurements within the sequences have the highest signal strengths, to derive timing offsets for the best candidate paths as a function of at least the measurements for the best candidate paths and the measurements adjacent thereto, wherein the derived timing offsets have resolutions higher than the predetermined timing resolution of the searcher unit, and to assign the finger processing elements to the best candidate paths using at least the derived timing offsets; and
- a combiner coupled to the plurality of finger processing elements and configured to combine the demodulated signals from each of the finger processing elements to generate an output signal from the rake receiver.

15. The rake receiver of claim 14, further including an input circuit coupled to the antenna, the input circuit including a bandpass filter for filtering the received RF signal, a demodulator for demodulating the bandpass-filtered signal into its in-phase and quadrature-phase components, and a matched filter corresponding to the transmitted pulse shape of the RF signal for filtering the in-phase and quadrature-phase components, wherein the input circuit generates in-phase and quadrature-phase output signals which are applied to the plurality of finger processing elements and the searcher unit.

16. The rake receiver of claim 14, wherein the finger processing elements receive in-phase and quadrature-phase components of the RF signal, and the finger processing elements include early, on-time and late samplers for sampling the in-phase and quadrature-phase components of the RF signal.

17. The rake receiver of claim 16, wherein the finger processing elements further include a timing/control unit for adjusting timing of the early, on-time and late samplers in response to at least the timing offsets for the best candidate paths derived by the finger assignment and control unit.

18. The rake receiver of claim 17, wherein the finger processing elements further include a plurality of de-spreaders for de-spreading the early, traffic-channel and pilot-channel on-time, and late in-phase and quadrature-phase samples using in-phase and quadrature-phase PN sequences.

19. The rake receiver of claim 18, wherein the finger processing elements further include a plurality of signal processing units for performing multiple access separation on the early, traffic-channel on-time, pilot-channel on-time, and late in-phase and quadrature-phase samples, and also include a plurality of integrators for accumulating each of the processed samples.

20. The rake receiver of claim 19, wherein the finger processing elements further include a code tracking loop which receives the early and late samples of the traffic or pilot channel, and generates a tracking adjustment signal based on the difference between the early and late samples which is used to adjust the timing of the timing/control unit such that the early, on-time and late samplers track the timing of the path being demodulated.

21. The rake receiver of claim 20, wherein the finger processing elements further include a demodulator for demodulating the traffic-channel on-time samples using the pilot-channel on-time samples to estimate the traffic channel.

22. The rake receiver of claim 14, wherein the searcher unit receives in-phase and quadrature-phase components of the RF signal, and the searcher unit includes samplers for sampling the in-phase and quadrature-phase components, a de-spreader for de-spreading the sampled components, accumulators for accumulating the de-spread components, and a squaring unit for squaring the magnitude of the accumulated RF signal.

23. The rake receiver of claim 14, wherein the finger assignment and control unit derives the timing offsets by defining a quadratic which approximates the multipath profile of the RF signal by passing through the measurement for the best candidate path and the measurements adjacent thereto, and solving for the peak of the quadratic to estimate the timing offset for the best candidate path.

24. The rake receiver of claim 23, wherein the quadratic has the form $Y=A*t^2+B*t+C$, the coefficients being the solution to a linear system defined by:

$$A-B+C=M(-1)$$

$$C=M(0)$$

$$A+B+C=M(1);$$

M(0) being the measurement for the best candidate path, and M(−1) and M(1) being the measurements adjacent to M(0).

25. The rake receiver of claim 24, wherein the peak of the quadratic occurs at:

$$t=(M(-1)-M(1))/(2*(M(-1)+M(1)-2*M(0)));$$

and the estimated timing offset from the quadratic is t/f, where 1/f is the fraction of a chip corresponding to the predetermined timing resolution.

26. The rake receiver of claim 23, wherein the finger assignment and control unit generates a correction factor and applies the correction factor to the estimated timing offset from the quadratic, the correction factor being determined using the estimated timing offset from the quadratic as an index to a correction curve representing differences between a set of estimated timing offsets determined using the quadratic and actual timing offsets.

27. The rake receiver of claim 23, wherein the finger assignment and control unit generates a correction factor and applies the correction factor to the estimated timing offset from the quadratic, the correction factor being determined using the estimated timing offset from the quadratic as an index to a lookup table having an unbiased estimator.

28. A method of adjusting finger processing elements in a rake receiver for use in a CDMA communication system, comprising the steps of:

receiving a spread-spectrum radio-frequency (RF) signal having a plurality of multipath signal components forming a multipath profile;

sampling one of the multipath signal components of the spread-spectrum RF signal to obtain early, on-time and late samples using a finger processing element;

deriving a timing offset for the on-time sample as a function of at least the early, on-time and late samples of the sampled multipath signal component;

defining a quadratic which passes substantially through the early, on-time and late samples, and solving for a peak of the quadratic to estimate the timing offset for the one-time sample;

generating a correction factor and applying the correction factor to the estimated timing offset from the quadratic; and adjusting the finger processing element to track the timing of the on-time sample of the sampled multipath signal component using the derived timing offset.

* * * * *